United States Patent
Naethke et al.

(10) Patent No.: US 9,411,724 B2
(45) Date of Patent: Aug. 9, 2016

(54) METHOD AND APPARATUS FOR A PARTIAL-ADDRESS SELECT-SIGNAL GENERATOR WITH ADDRESS SHIFT

(75) Inventors: Lutz Naethke, Braunschweig (DE); Eric Desmarais, Braunschweig (DE); Ralf Goettsche, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 13/993,062

(22) PCT Filed: Dec. 21, 2011

(86) PCT No.: PCT/US2011/066660
§ 371 (c)(1),
(2), (4) Date: Jun. 10, 2013

(87) PCT Pub. No.: WO2013/095471
PCT Pub. Date: Jun. 27, 2013

(65) Prior Publication Data
US 2013/0339660 A1   Dec. 19, 2013

(51) Int. Cl.
*G06F 12/02* (2006.01)
*G06F 12/06* (2006.01)
(Continued)

(52) U.S. Cl.
CPC .......... *G06F 12/0615* (2013.01); *G06F 1/3237* (2013.01); *G06F 1/3296* (2013.01);
(Continued)

(58) Field of Classification Search
CPC . G06F 1/3237; G06F 1/3296; G06F 9/30043; G06F 9/30145; G06F 9/34; G06F 9/345; G06F 9/355; G06F 9/3552; G06F 9/3895; G06F 12/04; G06F 12/0615; G06F 12/0886; G06F 2212/1028; Y02B 60/1225; Y02B 60/1221; Y02B 60/1285
USPC .................. 711/217, 219, 220; 712/208, 211
See application file for complete search history.

(56) References Cited

U.S. PATENT DOCUMENTS 8,006,075 B2   8/2011   Luttrell
8,134,875 B2   3/2012   Baxter
(Continued)

OTHER PUBLICATIONS

PCT International Search Report for PCT Counterpart Application No. PCT/US2011/066660, 3 pgs., (Jul. 27, 2012).
PCT Written Opinion of the International Searching Authority for PCT Counterpart Application No. PCT/US2011/066660, 4 pgs., (Jul. 27, 2012).
(Continued)

*Primary Examiner* — Arpan P. Savla
(74) *Attorney, Agent, or Firm* — Nicholson De Vos Webster & Elliott LLP

(57) ABSTRACT

In accordance with embodiments disclosed herein, there are provided methods, systems, mechanisms, techniques, and apparatuses for implementing and using a partial-address select-signal generator with address shift. For example, in one embodiment, such means may include receiving a plurality of address lines; splitting the plurality of address lines into a first sub-set of the plurality of address lines and a remaining sub-set of the plurality of address lines; passing the first subset of the plurality of address lines to an upper processing path; passing the remaining sub-set of the plurality of address lines to a lower processing path in parallel with the upper processing path; generating intermediate code on the upper processing path from the first sub-set of the plurality of address lines and from an intermediate carry result from the remaining sub-set of the plurality of address lines on the lower processing path; passing a hot signal type to a decoding unit on the upper processing path, wherein the hot signal type designates a decode scheme; generating specific hot-signal select line code based on the intermediate code and the hot signal type; and adopting decode scheme of the hot-signal select lines according to information from the lower processing path. Structure for performing the same are further disclosed.

22 Claims, 18 Drawing Sheets

(51) Int. Cl.
*G06F 12/04* (2006.01)
*G06F 9/30* (2006.01)
*G06F 9/345* (2006.01)
*G06F 9/38* (2006.01)
*G06F 1/32* (2006.01)
*G06F 12/08* (2016.01)

(52) U.S. Cl.
CPC ............ *G06F9/30043* (2013.01); *G06F 9/345* (2013.01); *G06F 9/3895* (2013.01); *G06F 12/04* (2013.01); *G06F 12/0886* (2013.01); *G06F 2212/1028* (2013.01); *Y02B 60/1221* (2013.01); *Y02B 60/1225* (2013.01); *Y02B 60/1285* (2013.01)

(56) References Cited

U.S. PATENT DOCUMENTS

2010/0274972 A1    10/2010  Babayan et al.
2011/0022824 A1*   1/2011   Goel ..................... G06F 9/3017
                                                              712/211

OTHER PUBLICATIONS

PCT Notification concerning Transmittal of International Preliminary Report on Patentability (Chapter I of the Patent Cooperation Treaty) for PCT Counterpart Application No. PCT/US2011/066660, 6 pgs., (Jul. 3, 2014).

Taiwan Patent Application No. 101142184, Lutz Naethke, et al., Office Action mailed Nov. 17, 2014, Taiwan Patent and Trademark Office.

* cited by examiner

METHOD AND APPARATUS FOR A PARTIAL-ADDRESS SELECT-SIGNAL GENERATOR WITH ADDRESS SHIFT

CROSS-REFERANCE TO RELATED APPLICATIONS

This patent application is a U.S. National Phase Application under 35 U.S.C. §371 of International Application No. PCT/US2011/066660, filed Dec. 21,2011, entitled METHOD AND APPARATUS FOR A PARTIAL-ADDRESS SELECT-SIGNAL GENERATOR WITH ADDRESS SHIFT.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for implementing and using a partial-address select-signal generator with address shift.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Computing architectures require memory to store data and instructions and generally benefit from having increased memory available. The types of memory vary from, for example, memory accessible within a central processing unit (CPU) to memory which is accessible, for example, through a backbone bus on a motherboard, to memory or storage within a persistent storage device, such as a hard disk drive or a high capacity solid state memory used for persistent storage.

Generally speaking, memory closer to the CPU may be accessed faster. Memory within a CPU may be referred to as cache, and may be accessible at different hierarchical levels, such as Level 1 cache (L1 cache) and Level 2 cache (L2 cache). System memory such as memory modules coupled with a motherboard may also be available.

CPU cache, such as L1 cache, is used by the central processing unit of a computer to reduce the average time to access memory. The L1 cache is a smaller, faster memory which stores copies of the data from the most frequently used main memory locations. L2 cache may be larger, but slower to access. And system memory may be larger still, but slower to access then any CPU based cache. As long as most memory accesses are cached memory locations, the average latency of memory accesses will be closer to the cache latency than to the latency of main memory.

When the processor needs to read from or write to a location in main memory, it first checks whether a copy of that data is in one of its caches (e.g., L1, L2 caches, etc.) and when available, the processor immediately reads from or writes to the cache, providing a much faster result than reading from or writing to main memory of the system.

As the amount of space available within a CPU's cache increases, the likelihood of a cache hit increases, and thus, the CPU can operate at increased speeds as the CPU is not forced to wait for lengthy retrieval times from a system's main memory. However, as the amount of space increase, the increased size of addressable memory requires larger address sizes to handle the increase in uniquely addressable memory locations.

The present state of the art may therefore benefit from systems and methods for implementing and using a partial-address select-signal generator with address shift as described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Described herein are systems and methods for implementing and using a partial-address select-signal generator with address shift.

For example, such means may include receiving a plurality of address lines; splitting the plurality of address lines into a first sub-set of the plurality of address lines and a remaining sub-set of the plurality of address lines; passing the first subset of the plurality of address lines to an upper processing path; passing the remaining sub-set of the plurality of address lines to a lower processing path in parallel with the upper processing path; generating intermediate code on the upper processing path from the first sub-set of the plurality of address lines and from an intermediate carry result from the remaining sub-set of the plurality of address lines on the lower processing path; passing a hot signal type to a decoding unit on the upper processing path, wherein the hot signal type designates a decode scheme; generating specific hot-signal select line code based on the intermediate code and the hot signal type; and adopting decode scheme of the hot-signal select lines according to information from the lower processing path. Structure for performing the same are further disclosed.

Upper line is a simplification of the line and the lower line provides correction bits which may sometimes have an influence on the upper line processing result. Combining the adder and decoding eliminates of the carry function resulting in improved processing efficiency.

As will be described in greater detail below, an intermediate code is generated between summation and decoding resulting in an overall reduction of calculation steps. This reduction yields a corresponding reduction in circuit complexity, which in turn results in an increase of performance and area savings as well as enabling power saving methodologies, for example, by switching on and off circuitries using the select lines. Practice of the disclosed embodiments may therefore benefit any silicon design through higher performing coder/decoder structures and/or power saving enabling methodologies for arrays.

While conventional mechanisms have attempted to implement separate hardware for the generation of an address select line signal and a sub-array selector signal, the mechanisms described herein include both in one circuit scheme.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

Figure 1A:
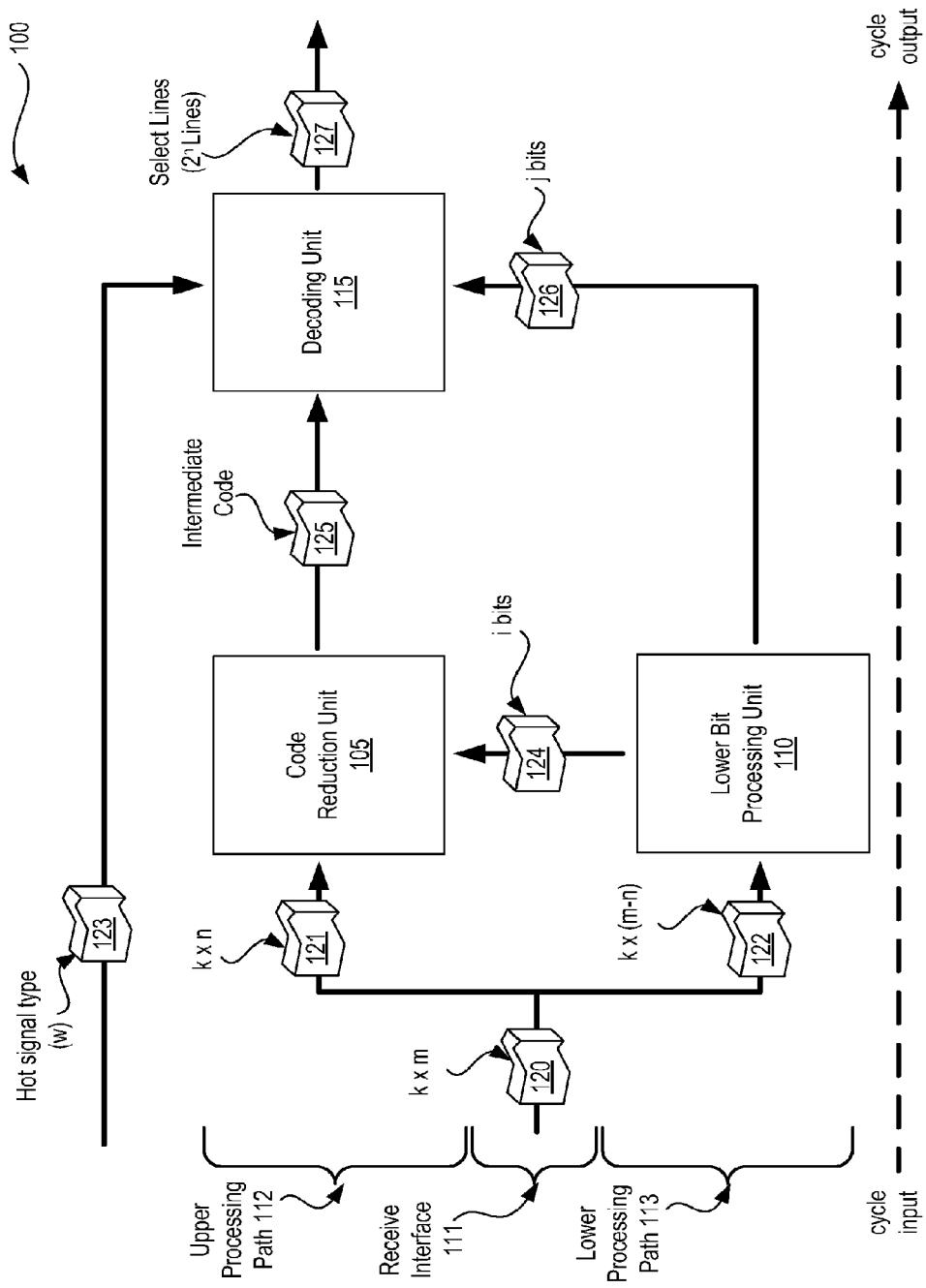
FIG. 1A illustrates an exemplary architecture in accordance with which embodiments may operate.

FIG. 1A illustrates an exemplary architecture 100 in accordance with which embodiments may operate. In accordance with the described embodiments, the depicted architecture 100 enables the generation and output of $2^n$ select lines 127 from "k×m" 120 input. For example, "k" represents the number of addresses and "m" represents the bit width of the "k" addresses. As depicted, "k×n" 121 is input into the code reduction unit 105, in which "k" represents the number of addresses and "n" represents the bit width of the "k" addresses, and further in which "n" is less than or equal to "m" of "k×m" 120. Further depicted is "k×(m−n)" 122 being input into the lower bit processing unit 110 in which "k" represents the number of addresses and "m−n" represents the bit width of the "k" addresses of "k×(m−n)" 122. In such an embodiment, the most significant bits of the "m" and the "n" address bits are aligned.

The addresses are split into m lines and n lines as shown with the lower address bits being directed to the lower bit processing unit 110 and the higher bits being directed to the code reduction unit 105. In a conventional solution, addresses are not split. Processing of the split lines can occur in parallel in the upper and the lower processing structures. For example, a first calculation is "k" times a number of lines as the input and the output is the number of lines times two resulting in carries and sums. The carries and sums represent a reduction in information. The upper and lower processing must therefore share information as depicted by the "i" and "j" elements 124 and 126 respectively. For example, "k−2" lines may be communicated to the upper processing elements as an intermediate carry result from the lower bit processing unit 110.

As depicted, the "k×m" 120 input may be received at a receive interface 111 and split into sub-sets of input (e.g., "k×n" 121 and "k×(m−n)" 122 which is the remainder not represented by "k×n" 121). The split inputs 121 and 122 are passed to the upper processing path 112 and the lower processing path 113 respectively. As shown, upper processing path 112 includes code reduction unit 105 and decoding unit 115 and operates in parallel with lower processing path 113 having the lower bit processing unit 110 thereupon.

Hot coding supports the enabling and disabling of circuits, such as a line or a sub-block memory structures (e.g. caches), and thus, enables power saving methodologies by reducing supply voltage or power/clock gating. For example, hot signal type (w) 123 is depicted as being passed to the decoding unit 115 which utilizes the hot signal type 123 for decoding or selecting from among the available $2^n$ select lines 127, for example, where "1" as a hot signal type "w" appears on the select lines alone or in a consecutive group which is controlled by the hot signal type 123. Functionality to generate line select signals is dynamically configurable, for example, enabling a read operation to read portions of data from one address but from different banks.

In one embodiment, one-hot decoding is utilized in which "w" representing the hot signal type 123 is set equal to 1. The structure may then be data mined to determine what the next line looks like, for example, how many lines will be equal to 1. The "w" hot signal type 123 may additionally be utilized to choose a resulting characteristic of the select lines and thus dictate the final scheme for decoding the signals via the decoding unit 115. For example, if the decoding unit 115 has multiple different algorithms available to it, then the "w" hot signal type 123 may be utilized to determine and select the correct decoding scheme and the correct decoding mechanism/algorithm at the decoding unit 115.

In digital circuits, one-hot refers to a group of bits among which the legal combinations of values are only those with a single high (1) bit and all the others low (0). For example, the output of a decoder is usually a one-hot code, and sometimes the state of a state machine is represented by a one-hot code. An alternative implementation in which all bits are '1' except one '0' would be commonly referred to as a one-cold scheme. The enabled hot code identifies the correct select line representing, for example, a memory line enable, an erase, or power savings by avoiding unnecessary functional components in a given cycle.

Thus, "w" hot signal type 123 represents the number of possibilities or the distinct number of characteristics. For example, multiple characteristics may be utilized or a unique characteristic may be specified for all combinations of lines (e.g., 110011), by "w" to the power of 2. For example, using "w" hot signal type 123, the decoding unit 115 can enable one memory line or enable two memory lines, specify an 8-bit integer data type or a 16-bit data type or indicate that 32 bits are required and so forth.

Power saving capabilities may be enabled by selecting only the required lines and negating operations for those lines which are not required. For example, if only 8 lines are required among an available 16 lines, then enabling only 8 lines rather than an available 16 lines results in a power savings by not firing up an entire 16 bit wide memory path when only a sub-set is required.

Further still, problems can arise by enabling more lines than are required. For example, if information is spread across non-contiguous memory regions then it becomes necessary to read portions from different areas. By defining the correct characteristic using the "w" hot signal type 123, the retrieval operations can be configured to only enable, for example, a lower part for memory retrieval from a first location and then read out the appropriate information, and then go to a separate memory region, activate and read a shorter area, and mask the remainder portion to "0" so as to avoid contamination of the read.

Such a scheme thus provides for a greater level of granularity than is attainable using conventional techniques. For example, cache lines have a certain granularity corresponding to the whole cache line. However, if the entire cache line is not required, then the remainder of the cache line is wasted when used with conventional techniques.

Through the use of the "w" hot signal type 123, a characteristic can be dictated which indicates, for example, all of a cache line, or a portion of the cache line, thus permitting a larger than necessary cache line to be broken down in to parts. For example, a first unit may use only 64 bits of a 512 bit cache line and have no use for the remainder. Without increased granularity, the remainder is wasted. Moreover, the unit may store 32 bits in one cache line and 32 bits in another, and so forth, thus causing even more overhead and waste among the 512 bit cache lines. Because the "w" hot signal type 123 enables a characteristic to be specified, the cache line may be broken down into sub-parts such that the appropriate portions of the large cache line are retrieved, and the remaining portions may be utilized by another unit or operation, without causing data contamination to the first unit.

Take for example one address that needs to be added in which the address is 16 bits. However, only bits 8 to 16 representing an index need to be decoded. Bits 8 to 16 will be taken as "n" and processed in the upper processing circuitry while the remainder will go to lower bit processing. The lower bits have influence on the upper bit processing which may be communicated as necessary through "i" bits 124 or "j" bits 126 from the lower path circuitry (e.g., the lower bit processing unit 110 on the lower processing path 113) to the upper path circuitry (e.g., "i" 124 may be communicated to the code reduction unit 105 on the upper processing path 112 and "j" bits 126 representing the result of the lower path's processing may be communicated to the decoding unit 115 on the upper processing path 112).

The "k×m" addresses are used to calculate the starting select line of the hot signal group. The specific inner structure enables performance improvement and power reduction due to the combination of addition and decoding. The combination of addition and decoding saves the carry-tree for carry propagation inside the adder which is no longer needed due to the intermediate code 125 and due to the specialized decoding scheme in the decoder unit 115.

The code reduction unit 105 calculates an intermediate code 125 out of the "k×n" 121 address bits. For the calculation, the code reduction unit 105 requires "i" bits 124 as a result from the lower bit processing unit 110 (e.g., internal carriers)." Where a carry input bit (e.g., "$C_{in}$" input) is provided as input into the lower bit processing unit 110, it may be communicated from the lower bit processing unit 110 to the code reduction unit 105 as "i" 124.

The intermediate code 125 is the sum of the "k×n" 121 address bits in a specific code which represents or corresponds to the starting select line of the hot signal group.

The decoding unit 115 (e.g., a decoding circuit) takes the intermediate code 125 and "j" bits 126 of the result from the lower bit processing unit 110 for generation of the select lines 127. The j bits 126 are used to determine the final starting select line considering the result of the lower bits.

Property signals of the lower bits controlling the code reduction, such as the signal "i" 124 and decoding input signal "j" provide unique improvements over conventional mechanisms which would require two-cycle processing for such addresses by providing information to the upper processing regarding the results of lower bit processing which proceeds in parallel to the upper bit processing.

Dependent on the hot signal type 123, one or a group of lines are set to '1'. The lower bit processing unit 110 uses the least significant "k×(m−n)" 122 address bits to retrieve all the necessary information for the two other circuits, the code reduction unit 105 and the decoding unit 115.

Figure 1B:
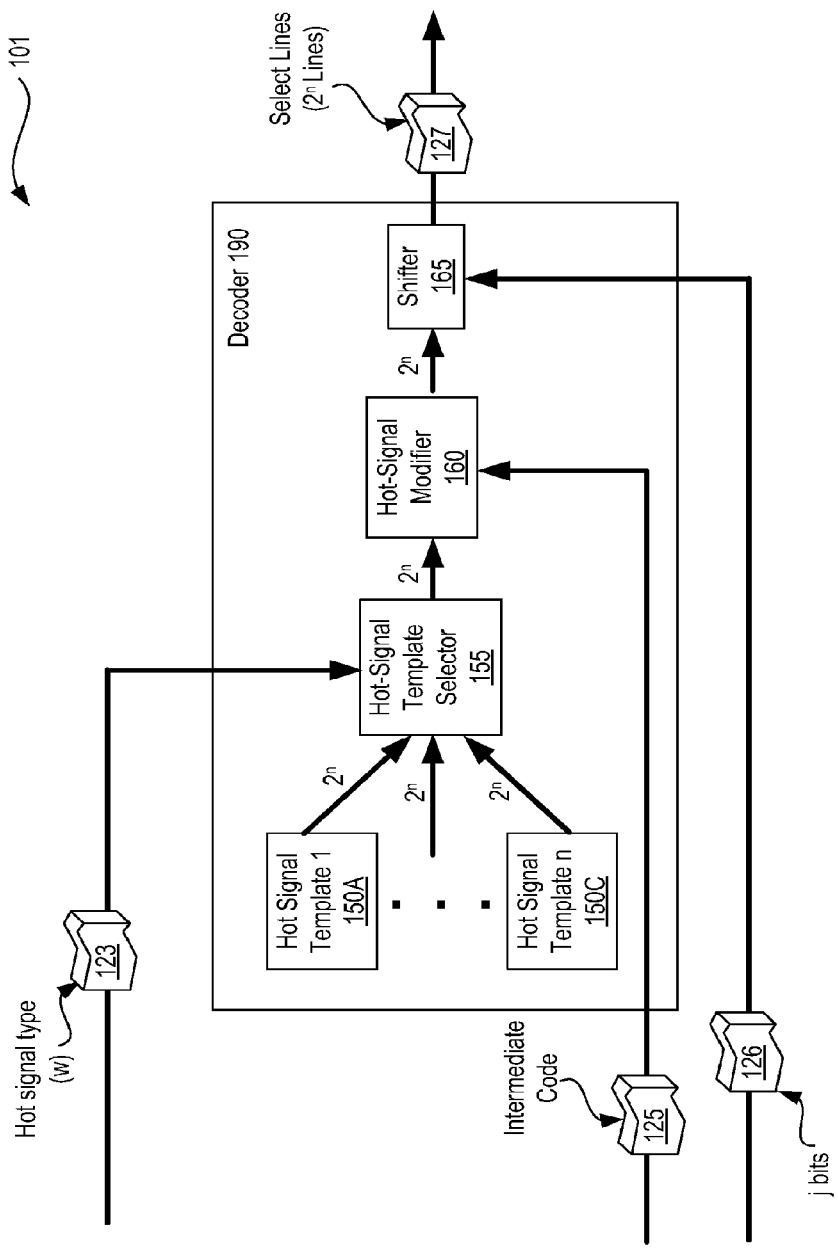
FIG. 1B illustrates an exemplary architecture of a decoder in accordance with which embodiments may operate.

FIG. 1B illustrates an exemplary architecture 101 of a decoder 190 in accordance with which embodiments may operate. In this first example, hot signal type 123 is depicted as an input to decoder 190. Intermediate code 125 and "j" bits 126 are additionally depicted as inputs to decoder 190. However, additional internal detail of decoder 190 is now depicted revealing additional implementation structures of a decoding circuit in accordance with one embodiment. As depicted, hot signal templates 1 through n denoted by elements 150A and 150C each yield $2^n$ signals which are input to the hot signal template selector 155. One of the hot-signal templates 150A to 150C will be chosen by the w 'hot-signal type' 123 selection lines input into the hot signal selector 155. Dependent on the intermediate code 125 input to the hot signal modifier 160, the chosen template will be modified. Influence of the lower "j" bits 126 is considered as an input into shifter 165, in which the content of the hot-signal selection lines 127 is shifted accordingly.

Figure 1C:
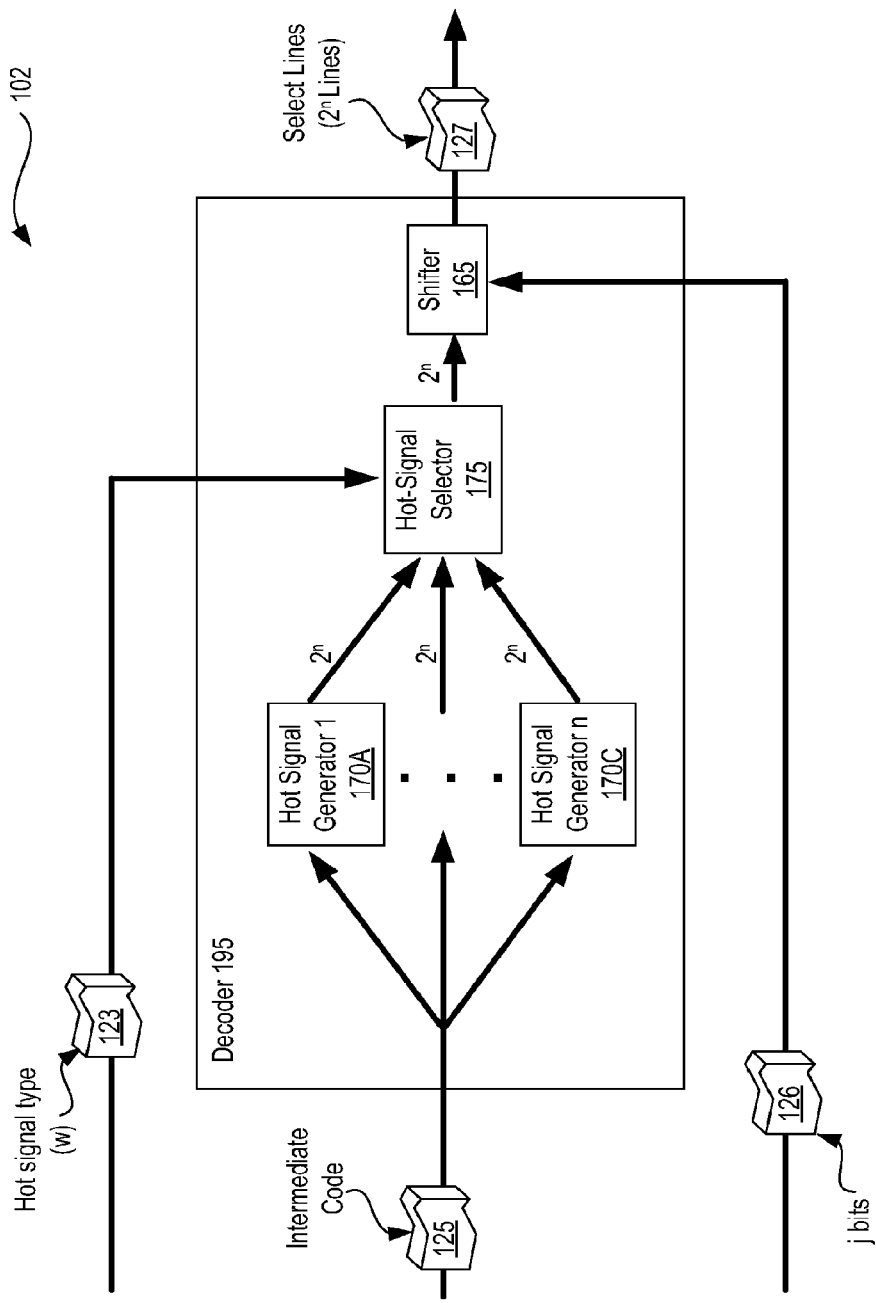
FIG. 1C illustrates an alternative exemplary architecture of a decoder in accordance with which embodiments may operate.

FIG. 1C illustrates an alternative exemplary architecture 102 of a decoder 195 in accordance with which embodiments may operate. In this second example, hot signal type 123 is depicted as an input to decoder 195. Intermediate code 125 and "j" bits 126 are additionally depicted as inputs to decoder 195. However, additional internal detail of decoder 195 is depicted revealing additional implementation structures of an alternative decoding circuit in accordance with one embodiment. As depicted, hot signal generator 1 through n denoted by elements 170A and 170C each yield $2^n$ signals which are input to the hot signal selector 175. Dependent on the intermediate code 125, different hot signal patterns will be generated. These different hot signal patterns include the template structure and modifications discussed in the first example of decoder 190 at FIG. 1B. With the receipt of w hot signal type 123 selection lines, one of the hot-signal patterns will be chosen by the hot signal selector 175 and subsequently shifted at shifter 165 according to the lower "j" bit 126 lines of the lower bit calculation.

Figure 2:
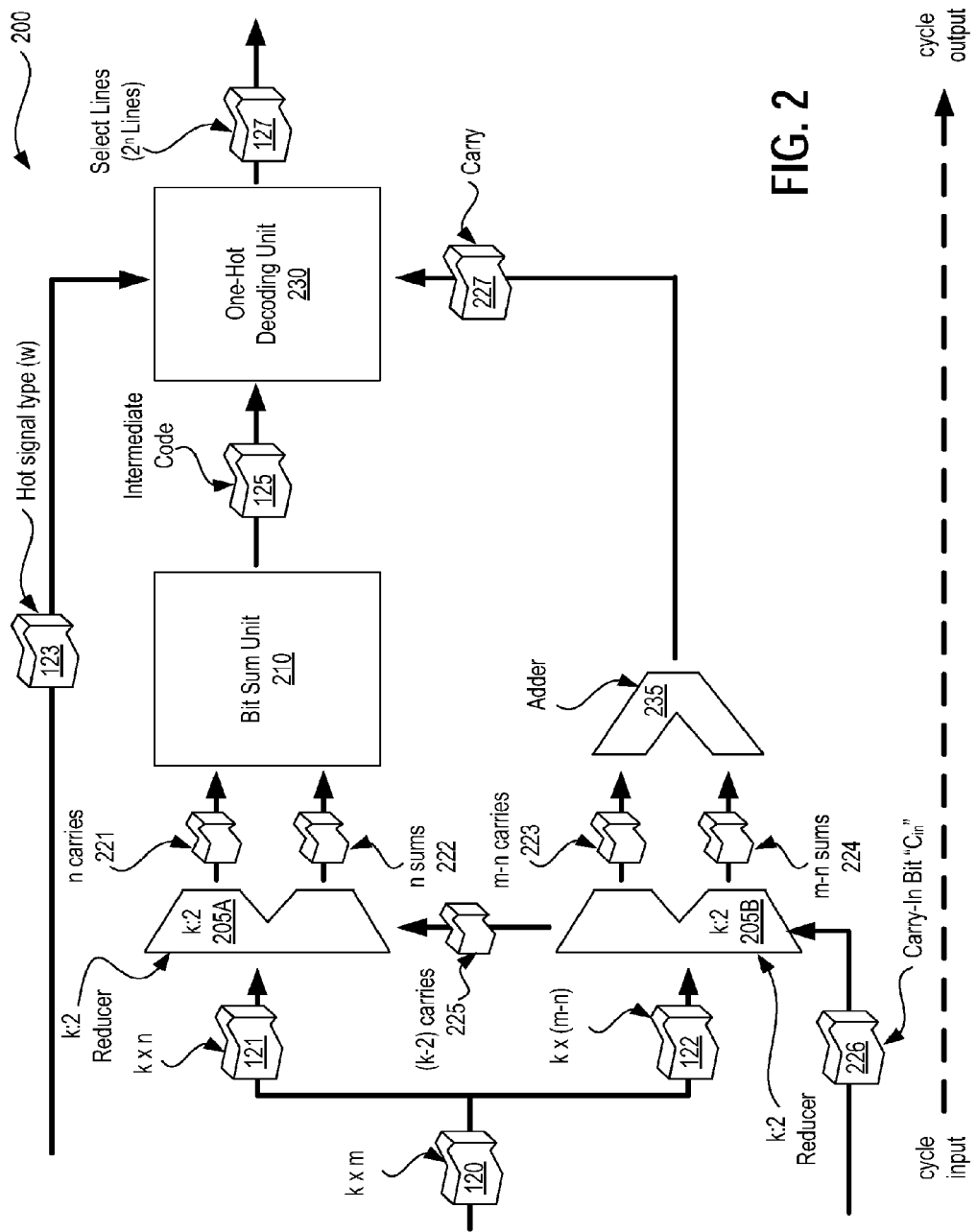
FIG. 2 illustrates an alternative exemplary architecture in accordance with which embodiments may operate.

FIG. 2 illustrates an alternative exemplary architecture 200 in accordance with which embodiments may operate. In particular, a more specialized embodiment is depicted in which the previously depicted code reduction unit 105 is now represented by a k:2 reducer 205A or a k:2 reduction circuit. The k:2 reducer 205A is followed by a bit sum unit 210.

In accordance with one embodiment, the k:2 reducer 205A is implemented via a carry-save adder. The k:2 reducer 205A calculates n internal carries 221 and n internal sums 222 out of "k×n" 121 address bits. The n internal carries 221 and the n internal sums 222 are input to the bit sum unit 210 which generates the intermediate code 125.

Lower bit processing is depicted via a second k:2 reducer 205B which in turn calculates m−n internal carries 223 and m−n internal sums 224. The k:2 reducer 205B further calculates (k−2) internal carries 225 from the lower bits "k×(m−n)" 122 of the lower bit processing at k:2 reducer 205B.

In accordance with one embodiment, the bit sum unit 210 generates an intermediate code 125 operating bit wise on the n internal carries 221 and sums 222.

The previously depicted decoding unit is replaced with a one-hot decoding unit 230 which set a single select line to '1'. The input to the one-hot decoding unit 230 being the intermediate code 125 and additionally a carry bit 227 of the adder 235 result from the lower bit processing via the second k:2 reducer 205B for the lower bits "k×(m−n)" 122 followed by the adder 235. The lower bit processing k:2 reducer 205B is similar to the code reduction functionality via k:2 reducer 205A, except that the lower bit processing k:2 reducer 205B gets only the "k×(m−n)" 122 lower bits of the addresses. The adder 235 only calculates the final carry bit 227 to be input into the one hot decoding unit 230.

Further depicted is the carry-in bit "$C_{in}$" 226 provided as input to the lower bit processing at k:2 reducer 205B. For example, given two addresses, if the carry-in bit 226 is set to 1 and provided as input to the k:2 reducer 205B, the address is set to negative, and thus, rather than adding, a second number may be subtracted from the first. Thus, a sign sensitive calculation may be performed. For example, a basic address may be provided and then an offset, and using the carry-in bit 226 which is input to the k:2 reducer 205B, a negative offset may be represented to step backwards from the given address as a negative offset, rather than a step forward using the offset.

Figure 3A:
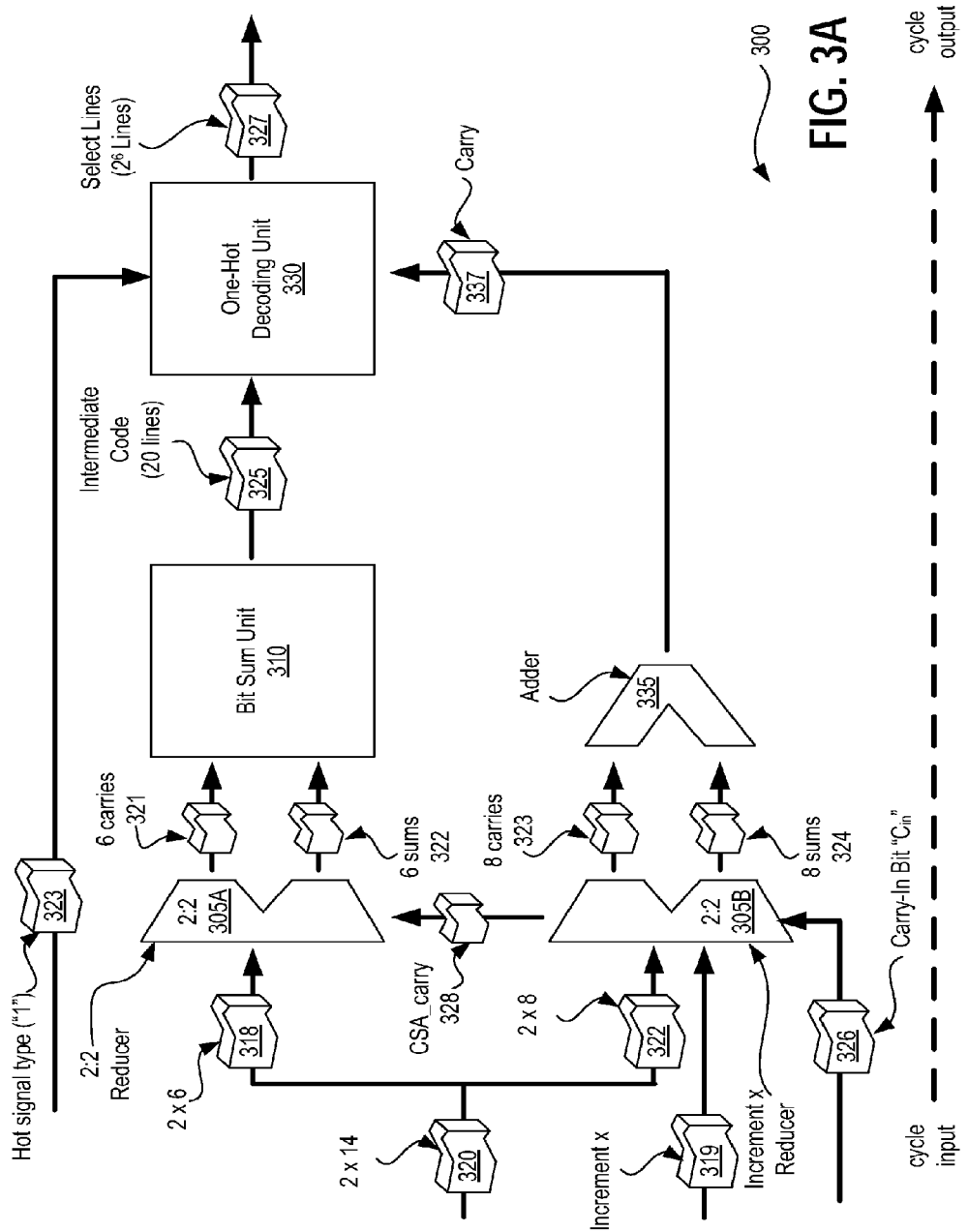
FIG. 3A illustrates an alternative exemplary architecture having increment x functionality in accordance with which embodiments may operate.

FIG. 3A illustrates an alternative exemplary architecture 300 having increment x functionality in accordance with which embodiments may operate.

In particular, select line generation is depicted based on two addresses in conjunction with increment functionality for specific address bits.

In this embodiment, code reduction is represented by the 2:2 reducer 305A followed by a bit sum unit 310. The inputs of the 2:2 reducer 305A are the higher six bits of two addresses represented as "2×6" at element 318. The "2×6" 318 input is derived from the larger incoming "2×14" 320 input in which the "2×6" 318 taken for input to the 2:2 reducer 305A yields the remaining "2×8" 322 input for the lower processing which is directed to the 2:2 increment "x" reducer 305B.

CSA_carry 328 is communicated to the 2:2 reducer 305A from the 2:2 increment "x" reducer 305B. The six carries 321 and the six sums 322 of the 2:2 reducer 305A are input to the bit sum unit 310 for generating the intermediate code 325 consisting of twenty lines in accordance with this embodiment.

Decoding is again replaced by the one-hot decoding unit 330 which receives the 20 lines of the intermediate code 325 as input and additionally takes the final carry 337 of the from the adder 335 computed as a result of the lower eight carries 323 and the lower eight sums 324 as input. Hot signal type 323 is passed into the one-hot decoding unit 330 with a value of "1" for use in decoding. The one-hot decoding unit 330 generates a '1' as the final select line depicted as select lines $2^6$ 327.

Lower bit processing includes the depicted 2:2 increment "x" reducer 305B which receives increment "x" 319 as input for increment "x" functionality and adder 335. The 2:2 increment "x" reducer receives the lower eight bits of two addresses depicted as "2×8" 322 and additionally receives increment "x" 319.

The "x" in increment "x" 319 represents a number of the power of two. Increment "x" 319 is similar to an address containing "x" as a number in which setting to a value of one causes the value of x to be added by carry-save addition to the adder result of the two addresses. The carry of the highest address bits during carry-save addition will be sent as Carry Save Addition carry or "CSA_carry" 328 to the 2:2 reducer 305A. The adder 335 calculates the final carry 337 of the eight carries 323 and the eight sums 324 and outputs the final carry 337 to be received by the one-hot decoding unit 330 as input. A simplified calculation of the select lines at the end is thus possible using the increment "x" functionality. Because the input is reduced to one line, the logic cells operate faster which permits a faster calculation.

Where the desired result is a predictable step forward or back, for example, to the next slot in the cache line, it may be desirable to bypass the address calculation and decode operations. Thus, the increment "x" functionality allows for a simple add or shift operation which negates the need to recalculate the next address by simply adding the increment "x" 319. For example, the increment "x" functionality may be used to set increment "x" 319 to a value of +2 to retrieve an increment of two, or may used to set other increment values such as each fourth, sixth, eighth position and so forth. Use of the increment "x" functionality reduces power consumption by negating the need to fire up a sub-set of the computational components. Where the value is 1 the address is reduced to only one line representing a value of 2 to the power of "x." Because the value is one, it can be treated as a constant which can then be used to move the characteristics of the select line at the end by a certain value, such as shifting or adding by a given value, without having to perform the full calculation and decode operation.

Carry-in bit "$C_{in}$" 326 is optionally provided as input to the lower bit processing at 2:2 reducer 305B, for example, to indicate or trigger reverse operation, such as a subtraction or negative offset rather than addition or a forward offset.

Figure 3B:
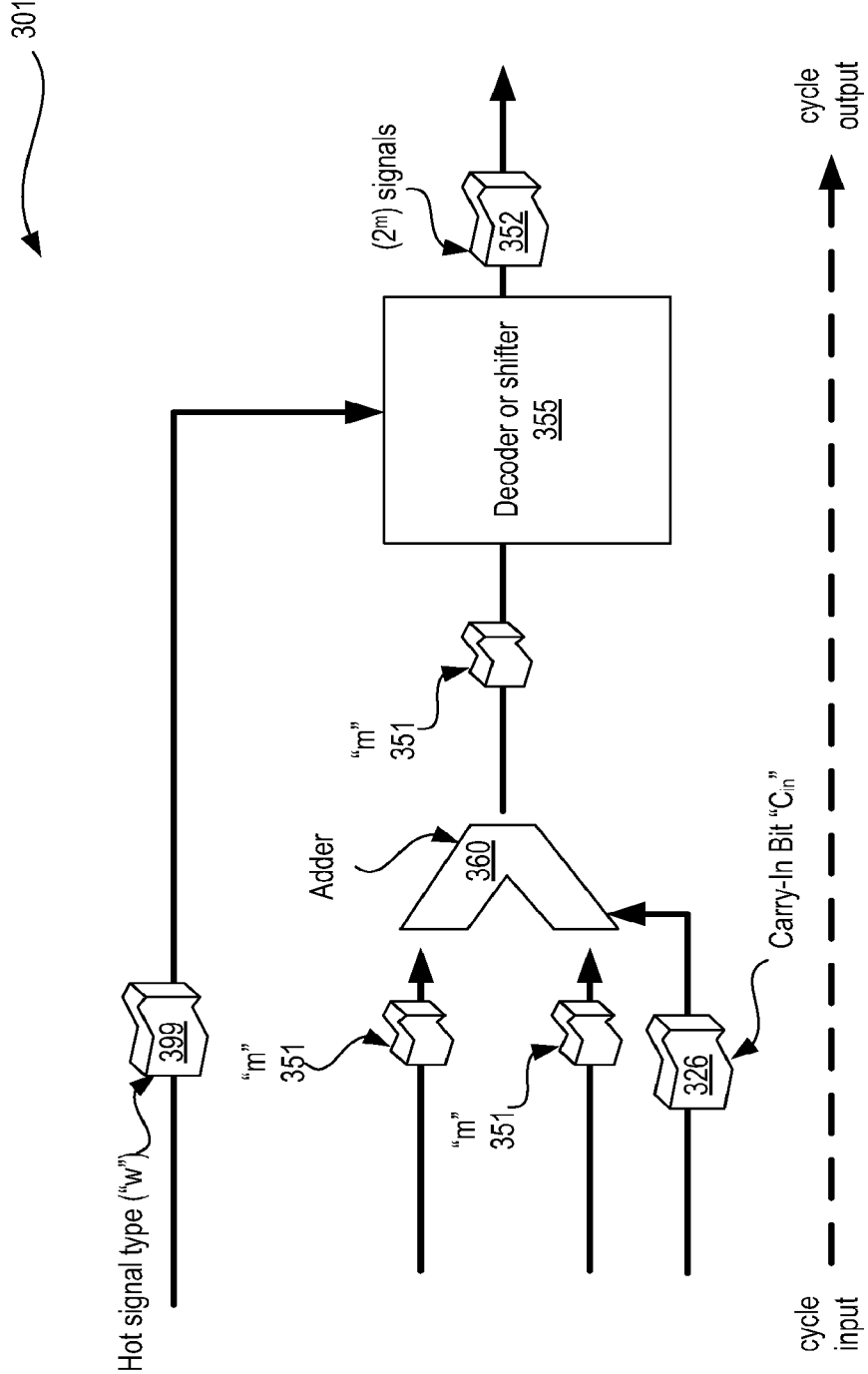
FIG. 3B illustrates an exemplary architecture having an adder and a decoder or shifter in accordance with which embodiments may operate.

FIG. 3B illustrates an exemplary architecture 301 having an adder and a decoder or shifter in accordance with which embodiments may operate. In particular, adder 360 and decoder or shifter 355 are depicted which may be utilized to perform a more computationally efficient shift or offset step using already calculated addresses.

For example, taking a previously calculated address, the decoder or shifter 355 can generate a group of hot signals out of the address. As depicted, taking "m" 351 as inputs and $C_{in}$ 326 as an input to the adder 360, signal "m" 351 is passed to the decoder or shifter 355 which in turn outputs $2^m$ signals 352. The decoder or shifter 355 gets a hot signal mask according to the hot-signal type having been generated in parallel to the addition at the adder 360, and the mask is shifted depending on the result "m" 351 of the adder 360. Hot signal type (w) 399 is depicted as being passed to the decoder or shifter 355 which utilizes the hot signal type 399 for decoding or selecting from among the available $2^m$ signals 352.

Figure 3C:
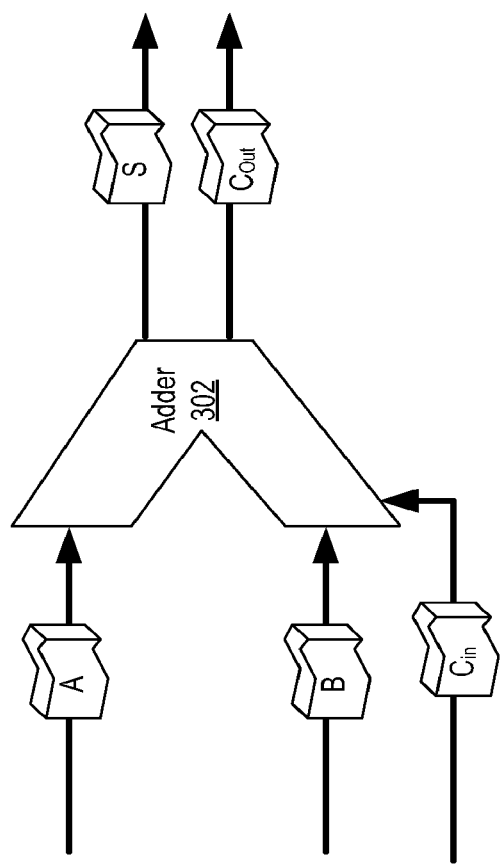
FIG. 3C illustrates an exemplary adder circuit in accordance with which embodiments may operate.

FIG. 3C illustrates an exemplary adder circuit 302 in accordance with which embodiments may operate. In particular, adder 302 receives A and B as input in addition to $C_{in}$. Adder 302 outputs $C_{out}$ and S.

The adder 302 adds binary numbers and accounts for values carried in (e.g., $C_{in}$) as well as out (e.g., $C_{out}$). A one-bit full adder adds three one-bit numbers, A, B, and $C_{in}$. A and B are the operands, and $C_{in}$ is a bit carried in (for example, from a past addition). Such a 1-bit circuit produces a two-bit output sum represented here by the signals $C_{out}$ and S, where "S" represents the sum.

A truth table for such a 1-bit adder 302 is set forth in TABLE 1 below as follows:

TABLE 1

| INPUTS | | | OUTPUTS | |
|---|---|---|---|---|
| A | B | $C_{in}$ | $C_{out}$ | S |
| 0 | 0 | 0 | 0 | 0 |
| 1 | 0 | 0 | 0 | 1 |
| 0 | 1 | 0 | 0 | 1 |
| 1 | 1 | 0 | 1 | 0 |
| 0 | 0 | 1 | 0 | 1 |
| 1 | 0 | 1 | 1 | 0 |
| 0 | 1 | 1 | 1 | 0 |
| 1 | 1 | 1 | 1 | 1 |

Figure 4A:
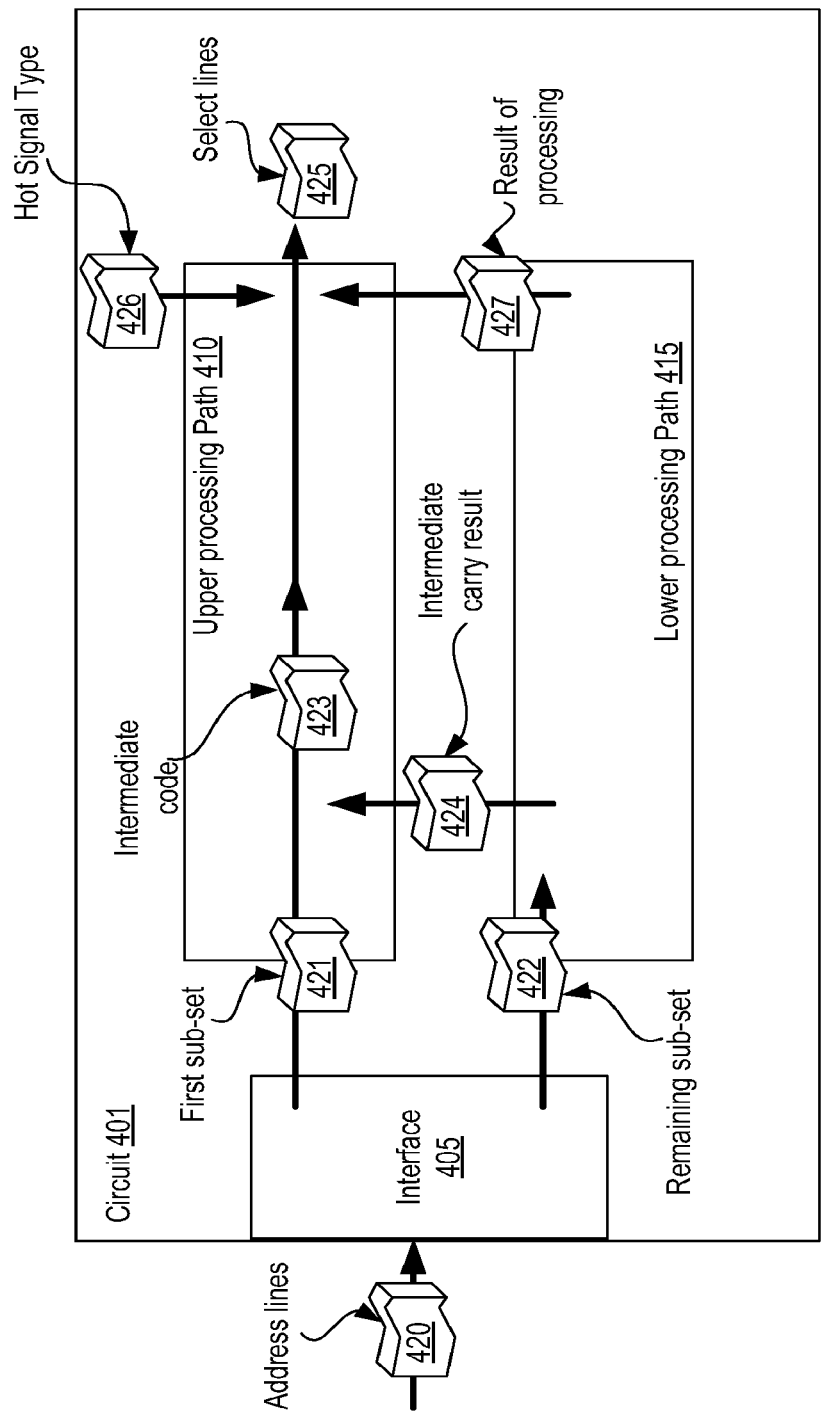
FIG. 4A illustrates an integrated circuit having upper and lower processing paths in accordance with which embodiments may operate.

FIG. 4A illustrates an integrated circuit 401 having upper and lower processing paths in accordance with which embodiments may operate. For example, in one embodiment a circuit 401 includes an interface 405 to receive a plurality of address lines 420; an upper processing path 410 to receive a first sub-set 421 of the plurality of address lines 420; a lower processing path 415 to receive a remaining sub-set 422 of the plurality of address lines 420 in which the lower processing path 415 is in parallel with the upper processing path 410; an intermediate code 423 based on the first sub-set 421 of the plurality of address lines 420 and an intermediate carry result 424 from the remaining sub-set 422 of the plurality of address lines 420; and a hot signal type 426 to designate a decode scheme for a plurality of select lines 425 generated based on the plurality of address lines 420.

In one embodiment, a final starting select line among the plurality of select lines 425 is determined based on a result of processing 427 for the remaining sub-set 422 of the plurality of address lines on the lower processing path 415.

Figure 4B:
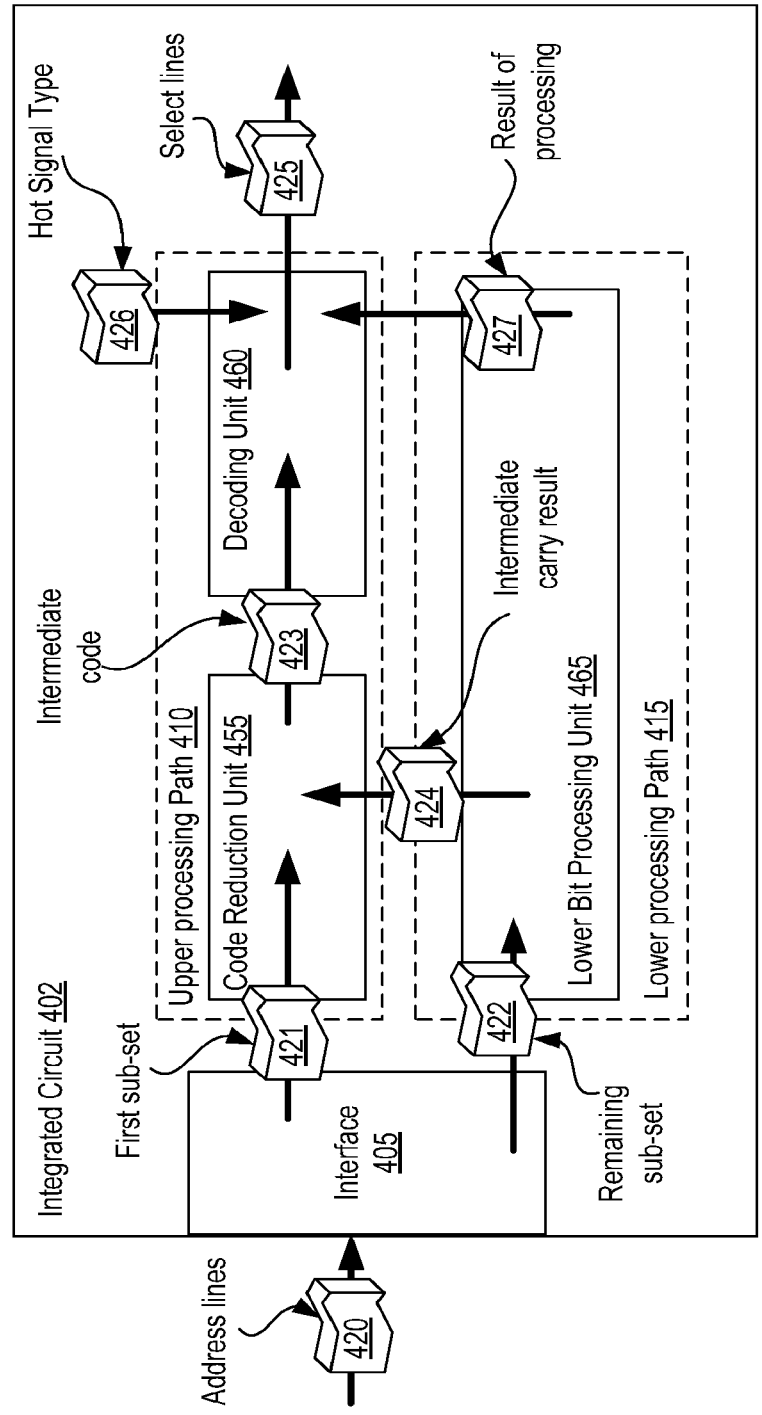
FIG. 4B illustrates an integrated circuit having code reduction, decoding, and lower bit processing units in accordance with which embodiments may operate.

FIG. 4B illustrates an integrated circuit 402 having code reduction, decoding, and lower bit processing units in accordance with which embodiments may operate. In one embodiment, an integrated circuit 402 includes an interface 405 to receive a plurality of address lines 420; a code reduction unit 455 and a decoding unit 460 forming an upper processing path 410; and a lower bit processing unit 465 forming a lower processing path 415 in parallel with the upper processing path 410. In such an embodiment, the code reduction unit 455 calculates an intermediate code 423 based on a first sub-set 421 of the plurality of address lines 420 and based further on an intermediate carry result 424 from the lower bit processing unit 465 calculated from the remaining sub-set 422 of the plurality of address lines 420. In such an embodiment, the decoding unit 460 generates a plurality of select lines 425 based on the intermediate code 423 from the code reduction unit 455 and based further on a hot signal type 426 designating a decode scheme.

In one embodiment, the lower bit processing unit 465 further communicates a result of processing 427 for the remaining sub-set 422 of the plurality of address lines 420 on the lower processing path 415 to the decoding unit 460 and the decoding unit 460 determines a final starting select line among the plurality of select lines 425 based on the result of processing 427 from the lower processing path 415.

Figure 5:
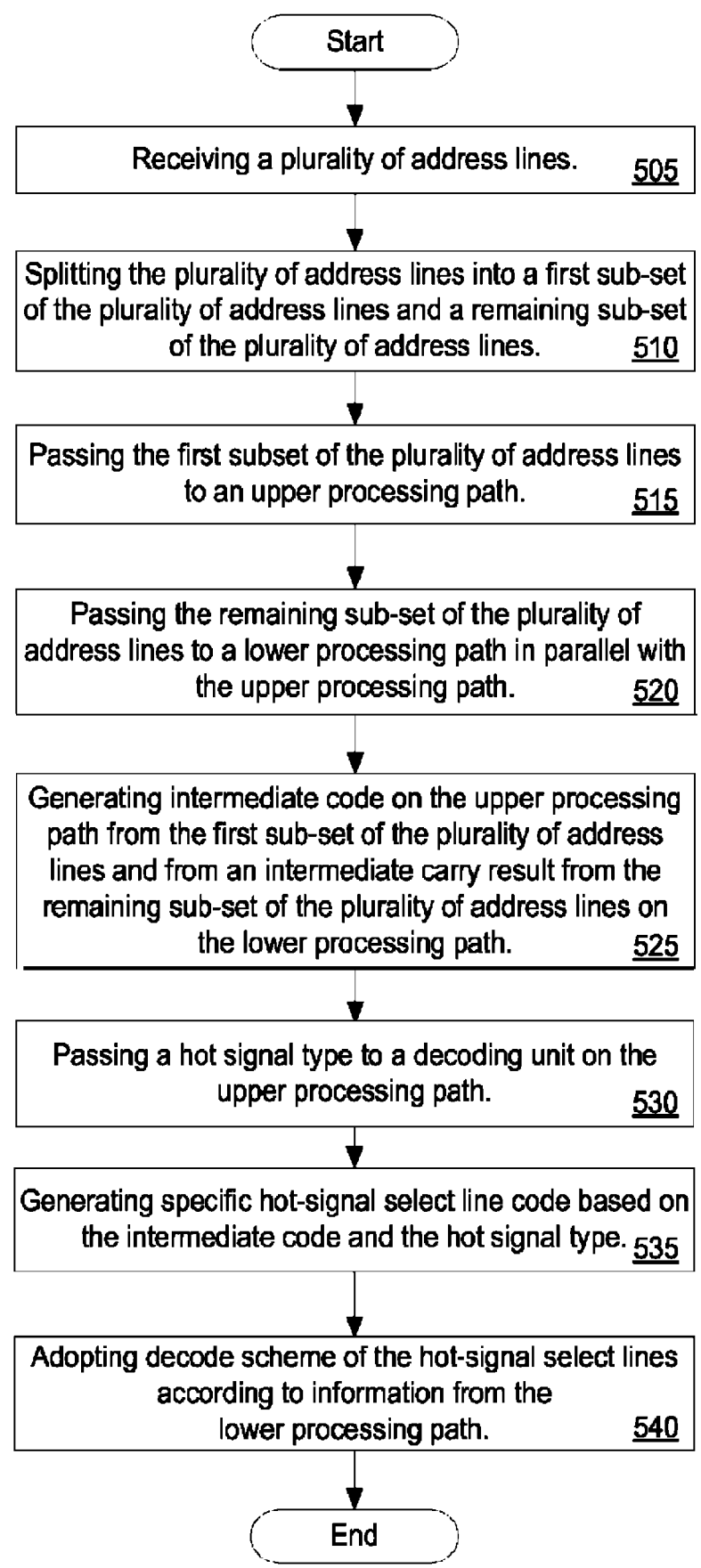
FIG. 5 is a flow diagram illustrating a method for implementing and using a partial-address select-signal generator with address shift in accordance with described embodiments.

FIG. 5 is a flow diagram 500 illustrating a method within a circuit, integrated circuit, processor, silicon integrated circuit, etc. Method 500 sets forth functionality for implementing and using a partial-address select-signal generator with address shift in accordance with described embodiments. Method 500 may be performed by processing logic that may include hardware (e.g., circuitry, dedicated logic, programmable logic, microcode, etc.). The numbering of the blocks presented is for the sake of clarity and is not intended to prescribe an order of operations in which the various blocks must occur.

Method 500 begins with processing logic for receiving a plurality of address lines (block 505).

At block 510, processing logic splits the plurality of address lines into a first sub-set of the plurality of address lines and a remaining sub-set of the plurality of address lines.

At block 515, processing logic passes the first subset of the plurality of address lines to an upper processing path.

At block 520, processing logic passes the remaining sub-set of the plurality of address lines to a lower processing path in parallel with the upper processing path.

At block 525, processing logic generates intermediate code on the upper processing path from the first sub-set of the plurality of address lines and from an intermediate carry result from the remaining sub-set of the plurality of address lines on the lower processing path.

At block 530, processing logic passes a hot signal type to a decoding unit on the upper processing path.

At block 535, processing logic generates specific hot-signal select line code based on the intermediate code and the hot signal type.

At block 540, processing logic adopts decode scheme of the hot-signal select lines according to information from the lower processing path.

Figure 6:
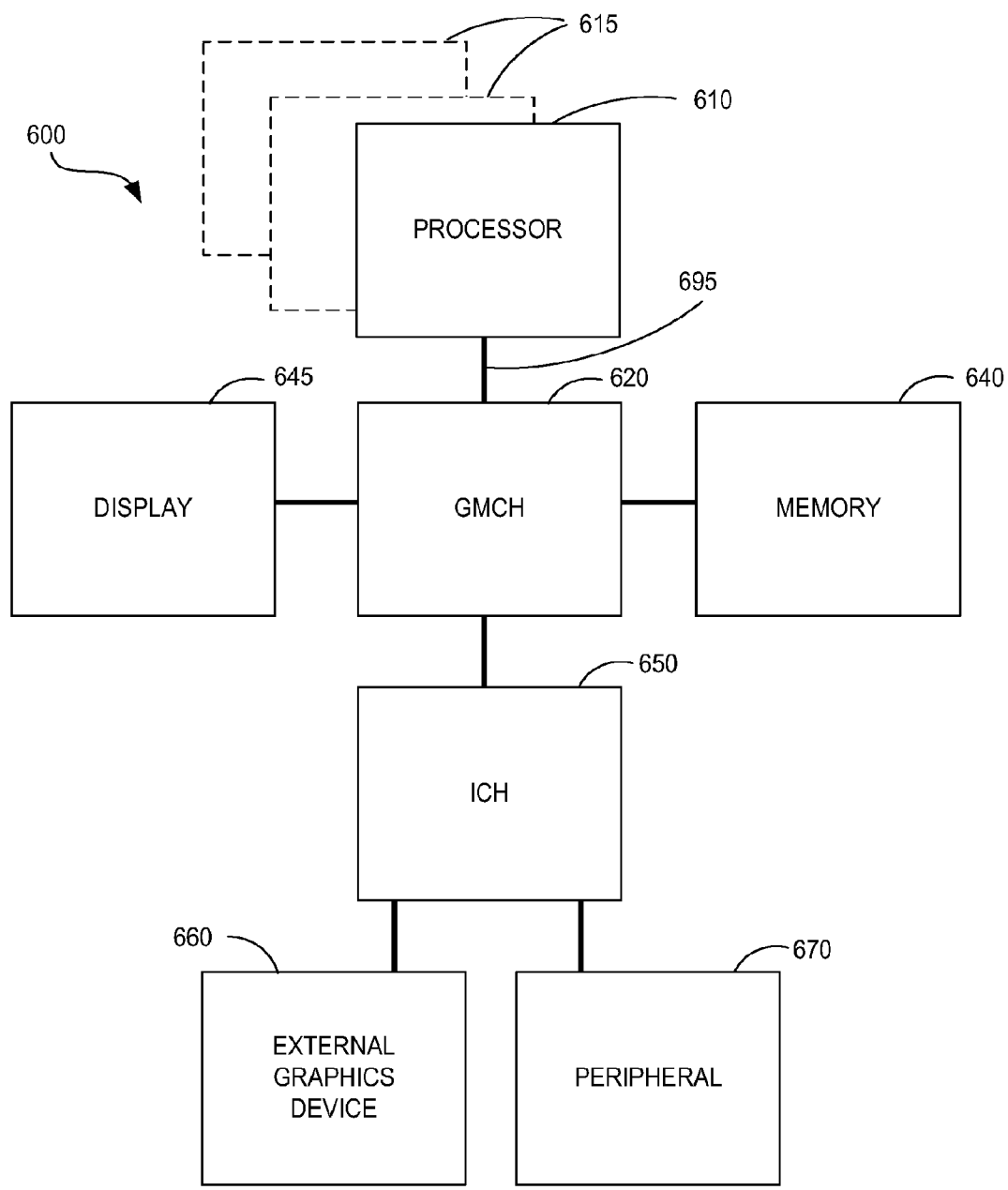
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
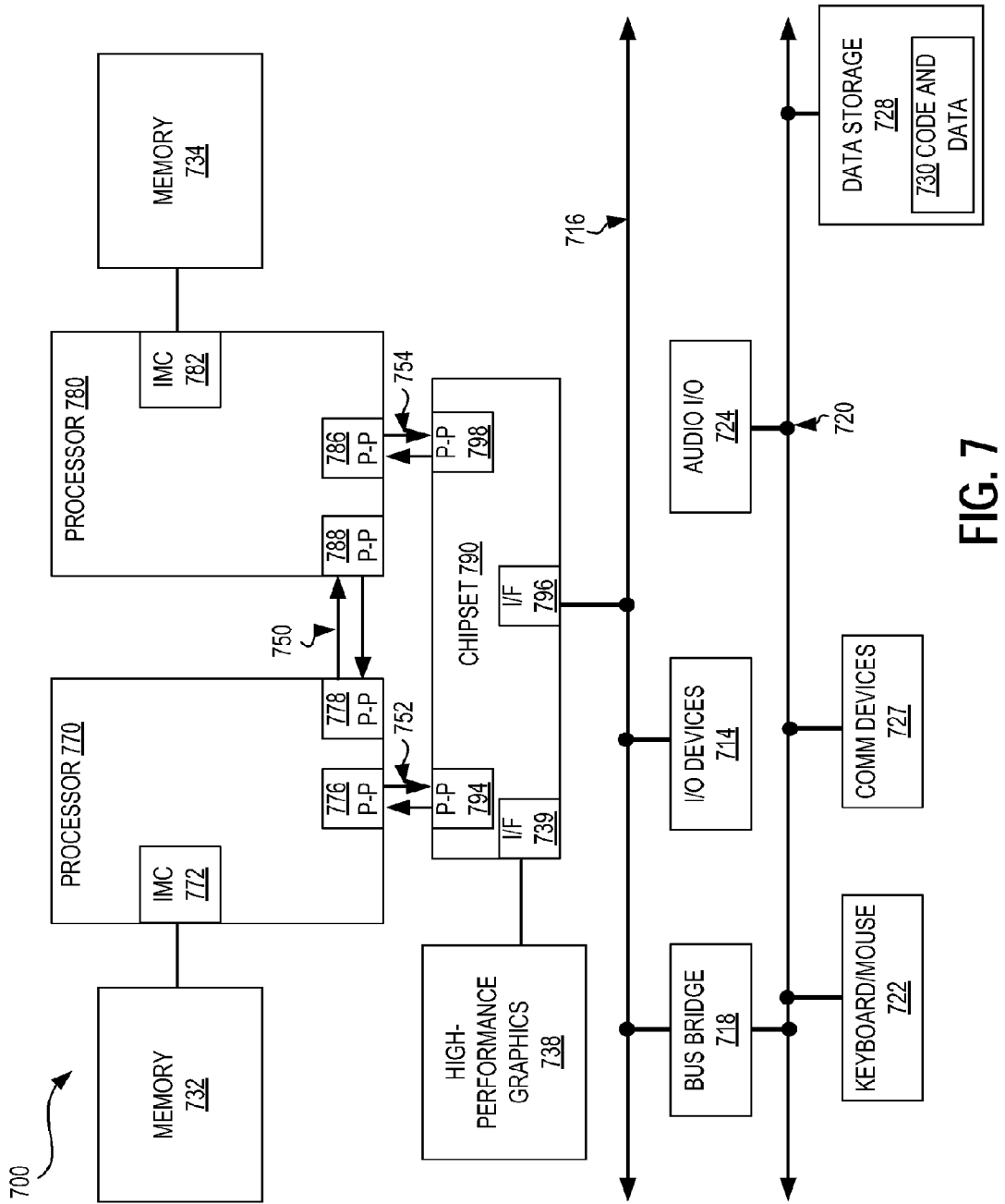
FIG. 7 is a block diagram of a computer system according to one embodiment.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610, 615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
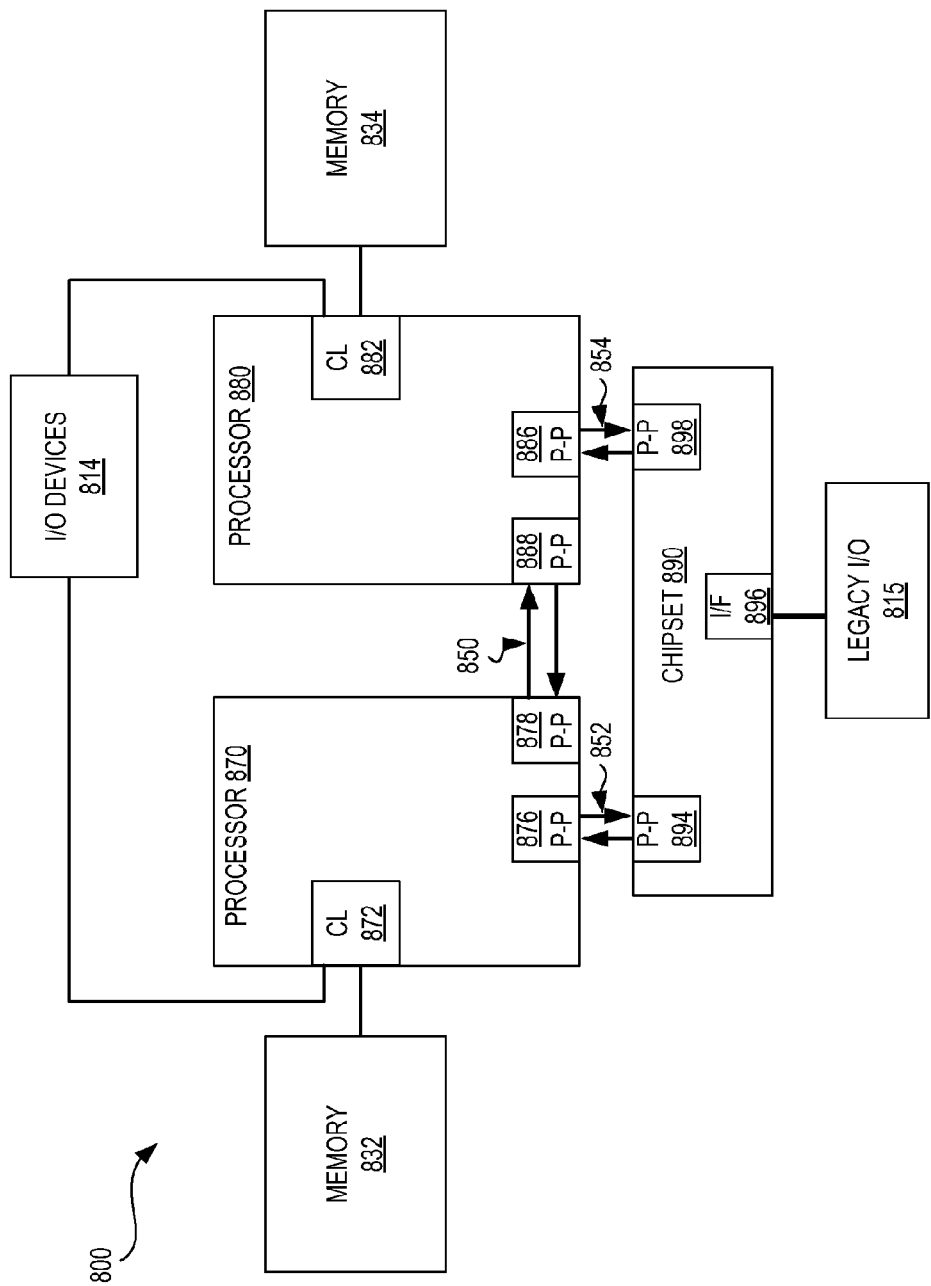
FIG. 8 is a block diagram of a computer system according to one embodiment.

Referring now to FIG. 8, shown is a block diagram of a system 800 in accordance with an embodiment of the present invention. FIG. 8 illustrates that the processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
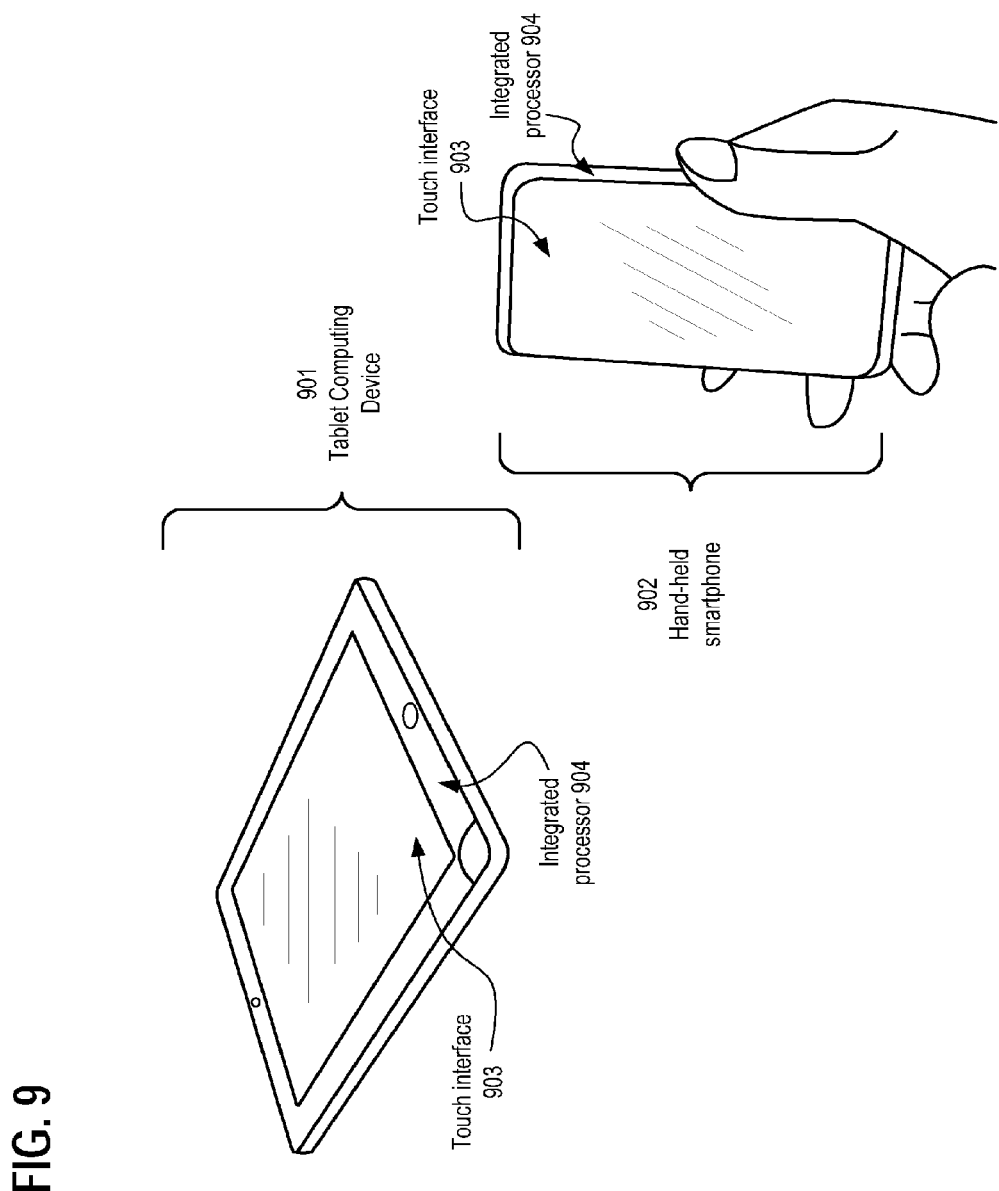
FIG. 9 depicts a tablet computing device and a hand-held smartphone each having a circuitry integrated therein as described in accordance with the embodiments.

FIG. 9 depicts a tablet computing device 901 and a hand-held smartphone 902 each having a circuitry integrated therein as described in accordance with the embodiments. As depicted, each of the tablet computing device 901 and the hand-held smartphone 902 include a touch interface 903 and an integrated processor 904 in accordance with disclosed embodiments.

For example, in one embodiment, a system embodies a tablet or a smartphone, in which a display unit of the system includes a touchscreen interface for the tablet or the smartphone and further in which memory and a processor are integrated within the tablet or smartphone, in which the integrated processor implements one or more of the embodiments described herein for implementing and using a partial-address select-signal generator with address shift. In one embodiment, the integrated processor of the tablet or smartphone is an integrated silicon processor functioning as a central processing unit for a tablet computing device or a smartphone.

Figure 10:
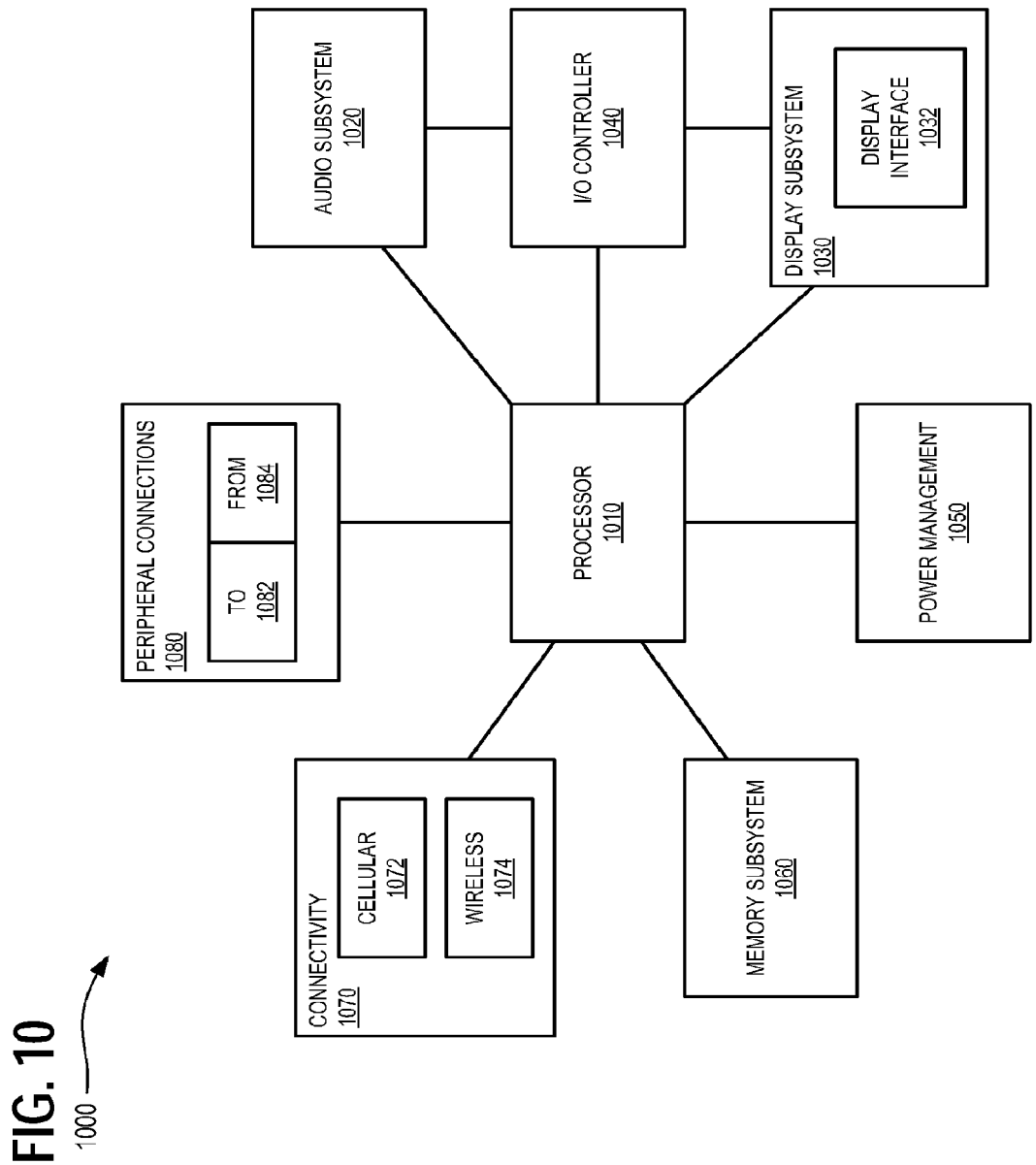
FIG. 10 is a block diagram of an embodiment of tablet computing device, a smart phone, or other mobile device in which touchscreen interface connectors are used.

FIG. 10 is a block diagram 1000 of an embodiment of tablet computing device, a smart phone, or other mobile device in which touchscreen interface connectors are used. Processor 1010 performs the primary processing operations. Audio subsystem 1020 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 1010.

Display subsystem 1030 represents hardware (e.g., display devices) and software (e.g., drivers) components that provide a visual and/or tactile display for a user to interact with the tablet computing device or smart phone. Display subsystem 1030 includes display interface 1032, which includes the particular screen or hardware device used to provide a display to a user. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to the tablet computing device or smart phone through which a user might interact. In one embodiment, I/O controller 1040 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 1050 that manages battery power usage, charging of the battery, and features related to power saving operation. Memory subsystem 1060 includes memory devices for storing information in the tablet computing device or smart phone. Connectivity 1070 includes hardware devices (e.g., wireless and/or wired connectors and communication hardware) and software components (e.g., drivers, protocol stacks) to the tablet computing device or smart phone to communicate with external devices. Cellular connectivity 1072 may include, for example, wireless carriers such as GSM (global system for mobile communications), CDMA (code division multiple access), TDM (time division multiplexing), or other cellular service standards). Wireless connectivity 1074 may include, for example, activity that is not cellular, such as personal area networks (e.g., Bluetooth), local area networks (e.g., WiFi), and/or wide area networks (e.g., WiMax), or other wireless communication.

Peripheral connections 1080 include hardware interfaces and connectors, as well as software components (e.g., drivers, protocol stacks) to make peripheral connections as a peripheral device ("to" 1082) to other computing devices, as well as have peripheral devices ("from" 1084) connected to the tablet computing device or smart phone, including, for example, a "docking" connector to connect with other computing devices. Peripheral connections 1080 include common or standards-based connectors, such as a Universal Serial Bus (USB) connector, DisplayPort including MiniDisplayPort (MDP), High Definition Multimedia Interface (HDMI), Firewire, etc.

Figure 11:
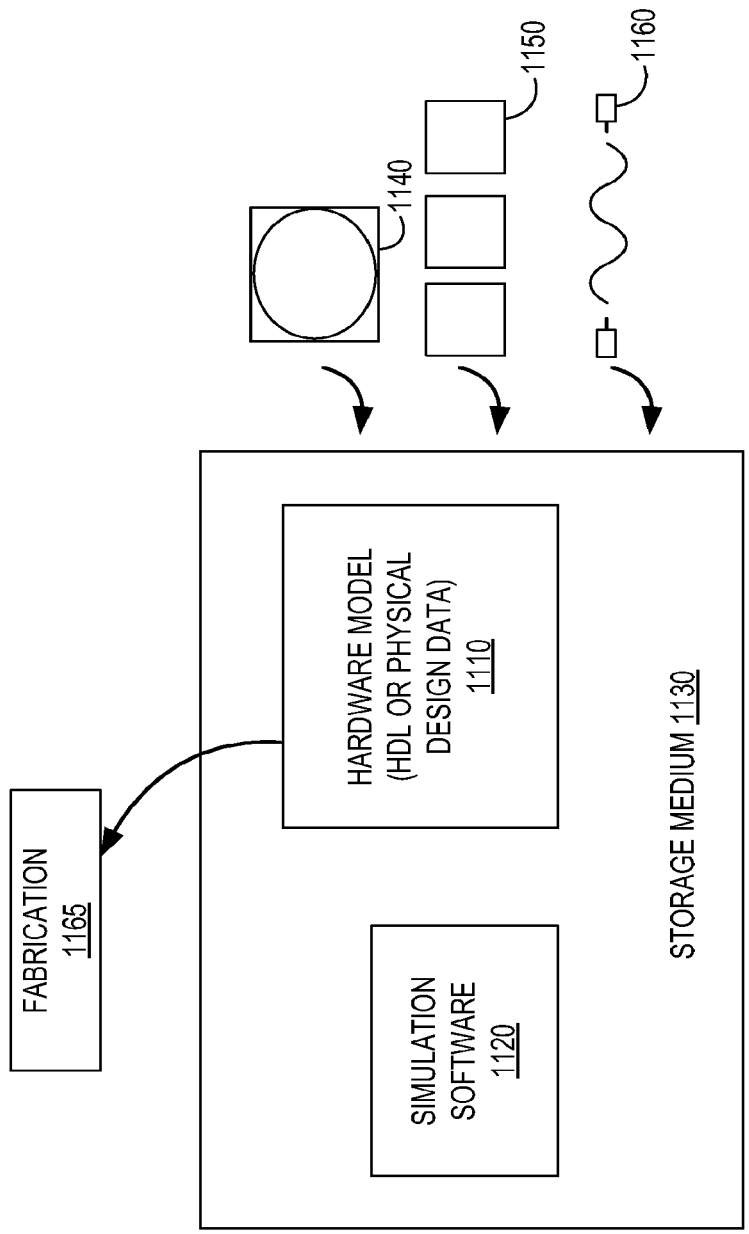
FIG. 11 is a block diagram of an IP core development system according to one embodiment.

FIG. 11 shows a block diagram illustrating the development of IP cores according to one embodiment. Storage medium 1130 includes simulation software 1120 and/or hardware or software model 1110. In one embodiment, the data representing the IP core design can be provided to the storage medium 1130 via memory 1140 (e.g., hard disk), wired connection (e.g., internet) 1150 or wireless connection 1160. The IP core information generated by the simulation tool and model can then be transmitted to a fabrication facility 1165 where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
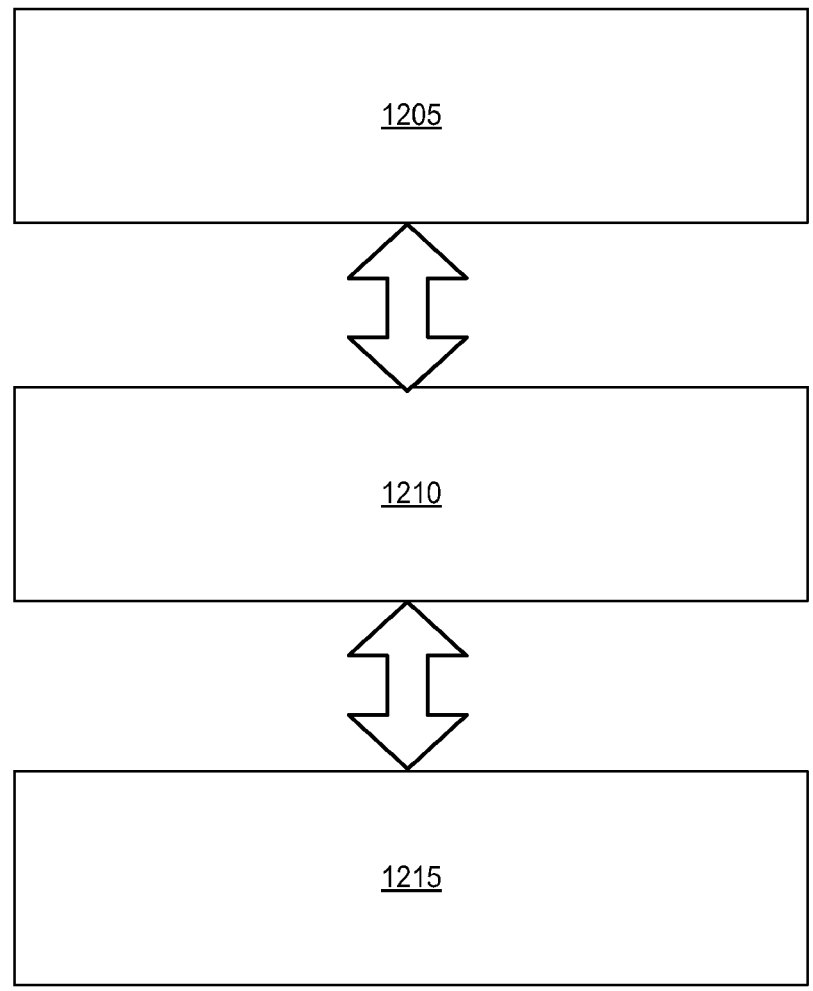
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to execute natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
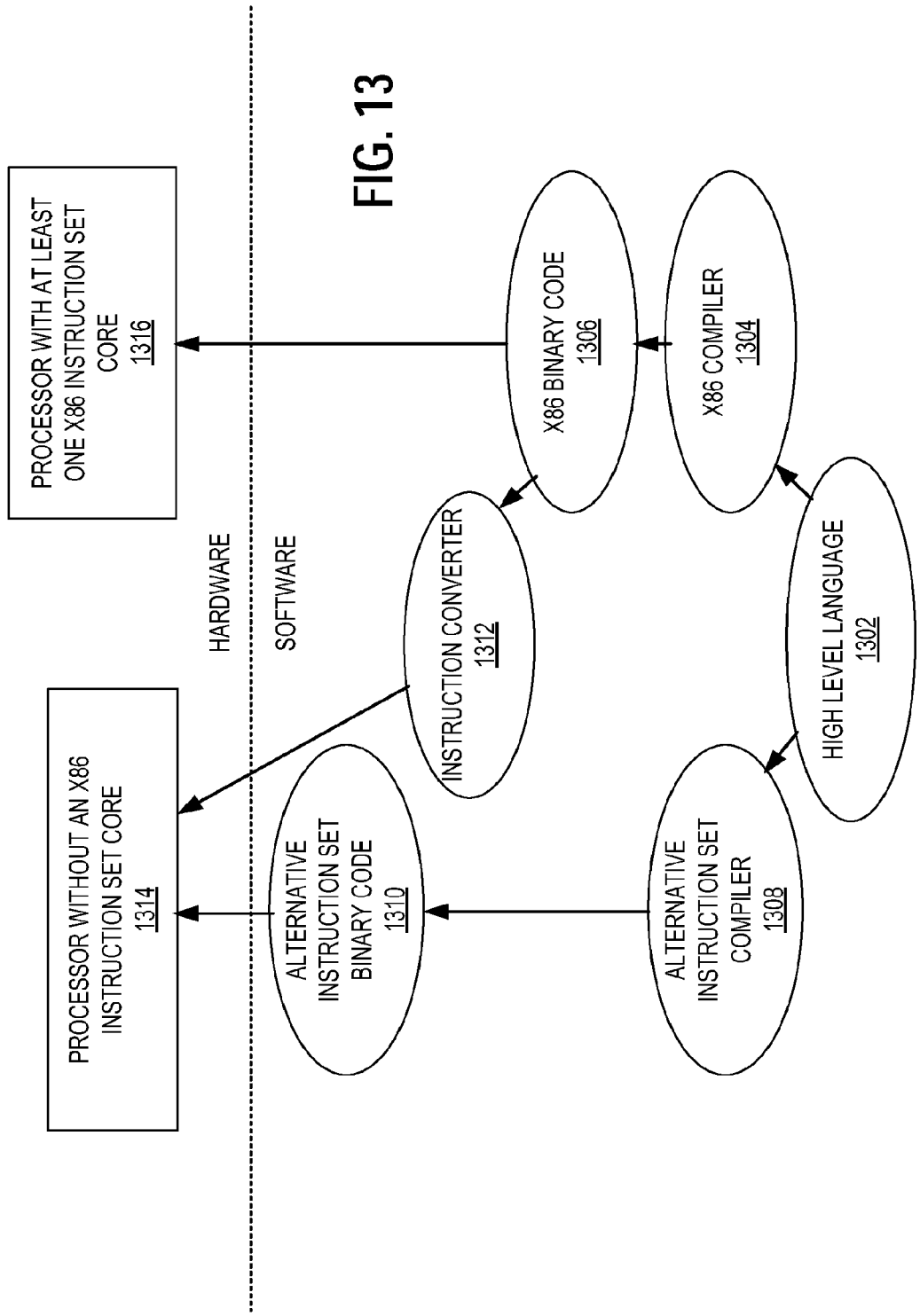
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A circuit comprising:
an interface to receive a plurality of address lines;
an upper processing path to receive a first sub-set of the plurality of address lines;
a lower processing path to receive a remaining sub-set of the plurality of address lines in parallel with the upper processing path;
an intermediate code based on the first sub-set of the plurality of address lines and an intermediate carry result from the remaining sub-set of the plurality of address lines; and
a hot signal type to designate a decode scheme for a plurality of select lines generated based on the plurality of address lines;
wherein the interface to receive the plurality of address lines comprises a circuit to receive "k×m" address lines, wherein "k" represents a number of addresses and "m" represents a bit width of the "k" addresses; and
wherein the upper processing path to receive the first sub-set of the plurality of address lines comprises the upper processing path to receive "k×n" address lines at a code reduction unit, wherein "k" represents the number of addresses and further wherein "n" represents the bit width of the "k" addresses in which "n" is less than or equal to "m" of the "k×m" address lines received at the interface.

2. The circuit of claim 1:
wherein increment x functionality of the circuit receives an increment x value at the lower processing path, wherein the increment x enables the circuit to shift one of the plurality of address lines; and
wherein the remaining plurality of address lines are set to a value of zero.

3. The circuit of claim 1, wherein the upper processing path to receive the first sub-set of the plurality of address lines comprises a code reduction unit to calculate the intermediate code.

4. The circuit of claim 3, wherein the code reduction unit to calculate the intermediate code comprises calculating the intermediate code based on a sum of the first sub-set of the plurality of address lines and based further on the intermediate carry result from the remaining sub-set of the plurality of address lines.

5. The circuit of claim 3, wherein the lower processing path comprises a lower bit processing unit in parallel with the code reduction unit, wherein the lower bit processing unit communicates the intermediate carry result to the code reduction unit to calculate the intermediate code.

6. The circuit of claim 3, wherein the upper processing path further comprises a decoding unit to receive the intermediate code and to generate the plurality of select lines based on the decode scheme designated by the hot signal type.

7. The circuit of claim 6, wherein the decoding unit to further determine a final starting select line among the plurality of select lines based on a result of processing for the remaining sub-set of the plurality of address lines on the lower processing path.

8. The circuit of claim 1, wherein the lower processing path to receive the remaining sub-set of the plurality of address lines in parallel with the upper processing path comprises the lower processing path to receive "k×(m−n)" address lines at a lower bit processing unit, wherein "k" represents the number of addresses and "m−n" represents the bit width of the "k" addresses of "k×(m−n)".

9. The circuit of claim 8, wherein a most significant bit of each of "m" and "n" are aligned.

10. The circuit of claim 1, wherein the first sub-set of the plurality of address lines and the remaining sub-set of the plurality of address lines is non-overlapping.

11. The circuit of claim 1, wherein the circuit is embodied in an integrated silicon processor.

12. The circuit of claim 11, wherein the integrated silicon processor comprises a central processing unit for one of a tablet computing device or a smartphone.

13. The circuit of claim 1:
wherein the upper processing path comprises a reducer to receive the first sub-set of the plurality of address lines;
wherein the reducer calculates a plurality of carries and a plurality of sums from the first sub-set of the plurality of address lines; and
wherein the reducer to communicate the plurality of carries and the plurality of sums to a bit sum unit on the upper processing path which responsively generates the intermediate code.

14. The circuit of claim 1, wherein the upper processing path comprises a one-hot decoding unit to receive the hot signal type designates the decode scheme for the plurality of select lines and to further receive the intermediate code and wherein the one-hot decoding unit to generate the plurality of select lines.

15. The circuit of claim 1, wherein the hot signal type to designate the decode scheme for the plurality of select lines comprises the hot signal type to designate one of the following:
enabling a sub-set of the plurality of select lines generated;
enabling a read operation to read portions of data from one address but from different banks;
enabling a decoding algorithm based on quantity of the plurality of select lines set to a value of "1;" and
enabling a portion of a cache line, wherein the portion of the cache line is less than the length of the cache line.

16. An integrated circuit comprising:
an interface to receive a plurality of address lines;
a code reduction unit and a decoding unit forming an upper processing path;
a lower bit processing unit forming a lower processing path in parallel with the upper processing path;
wherein the code reduction unit to calculate an intermediate code based on a first sub-set of the plurality of address lines and based further on an intermediate carry result from the lower bit processing unit calculated from the remaining sub-set of the plurality of address lines;
wherein the decoding unit to generate a plurality of select lines based on the intermediate code from the code reduction unit and based further on a hot signal type designating a decode scheme;

wherein the interface to receive the plurality of address lines comprises the to receive "k×m" address lines, wherein "k" represents a number of addresses and "m" represents a bit width of the "k" addresses; and wherein the upper processing path to receive the first sub-set of the plurality of address lines comprises the upper processing path to receive "k×n" address lines at a code reduction unit wherein "k'l re resents the number of addresses and further wherein " "n" represents the bit width of the "k" addresses in which "n" is less than or equal to "m" of the "k×m" address lines received at the interface.

17. The integrated circuit of claim 16:
wherein the lower bit processing unit to further communicate a result of processing for the remaining sub-set of the plurality of address lines on the lower processing path to the decoding unit; and
wherein the decoding unit to further determine a final starting select line among the plurality of select lines based on the result of processing.

18. A method in an integrated circuit comprising:
receiving a plurality of address lines at an interface;
splitting the plurality of address lines into a first sub-set of the plurality of address lines and a remaining sub-set of the plurality of address lines;
passing the first subset of the plurality of address lines to an upper processing path;
passing the remaining sub-set of the plurality of address lines to a lower processing path in parallel with the upper processing path;
generating intermediate code on the upper processing path from the first sub-set of the plurality of address lines and from an intermediate carry result from the remaining sub-set of the plurality of address lines on the lower processing path;
passing a hot signal type to a decoding unit on the upper processing path, wherein the hot signal type designates a decode scheme; and
generating a plurality of select lines based on the intermediate code and the decode scheme;
wherein receiving the plurality of address lines comprises receiving "k×m" address lines, wherein "k" represents a number of addresses and "m" represents a bit width of the "k" addresses; and
wherein the upper processing path receiving the first sub-set of the plurality of address lines comprises the upper processing path receiving "k× n" address lines at a code reduction unit, wherein "k" represents the number of addresses and further wherein "n" represents the bit width of the "k" addresses in which "n" is less than or equal to "m" of the "k×m" address lines received at the interface.

19. The method of claim 18, further comprising:
initiating a power savings operation by enabling fewer than all of the plurality of select lines in accordance with the decode scheme.

20. A system comprising:
a display unit;
a memory; and
a processor, wherein the processor comprises an interface to receive a plurality of address lines, an upper processing path to receive a first sub-set of the plurality of address lines, a lower processing path to receive a remaining sub-set of the plurality of address lines in parallel with the upper processing path, an intermediate code based on the first sub-set of the plurality of address lines and an intermediate carry result from the remaining sub-set of the plurality of address lines, and a hot signal type to designate a decode scheme for a plurality of select lines generated based on the plurality of address lines;
wherein the interface to receive the plurality of address lines comprises a circuit to receive "k×m" address lines, wherein "k" represents a number of addresses and "m" represents a bit width of the "k" addresses; and
wherein the upper processing path to receive the first sub-set of the plurality of address lines comprises the upper processing path to receive "k×n" address lines at a code reduction unit, wherein "k" represents the number of addresses and further wherein "n" represents the bit width of the "k" addresses in which "n" is less than or equal to "m" of the "k×m" address lines received at the interface.

21. The system of claim 20:
wherein the system embodies a tablet or a smartphone;
wherein the display unit comprises a touchscreen interface of the tablet or the smartphone; and
wherein the memory and the processor are integrated within the tablet or smartphone.

22. The system of claim 20,
wherein the upper processing path to receive the first sub-set of the plurality of address lines comprises a code reduction unit to calculate the intermediate code.

* * * * *